(12) United States Patent
Matsumoto et al.

(10) Patent No.: US 6,977,651 B1
(45) Date of Patent: Dec. 20, 2005

(54) 3-D MODEL PROVIDING DEVICE

(75) Inventors: Yukinori Matsumoto, Moriguchi (JP);
Kota Fujimura, Moriguchi (JP);
Kazuhide Sugimoto, Moriguchi (JP);
Yasuhiro Oue, Moriguchi (JP); Toru Kitamura, Moriguchi (JP); Osamu Ota, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/913,270

(22) PCT Filed: Feb. 18, 2000

(86) PCT No.: PCT/JP00/00930

§ 371 (c)(1),
(2), (4) Date: Aug. 10, 2001

(87) PCT Pub. No.: WO00/48698

PCT Pub. Date: Aug. 24, 2000

(30) Foreign Application Priority Data

| Feb. 19, 1999 | (JP) | ................................. 11-042389 |
| Sep. 29, 1999 | (JP) | ................................. 11-277099 |
| Jan. 31, 2000 | (JP) | ............................. 2000-023210 |

(51) Int. Cl.⁷ .......................................... G06T 15/00
(52) U.S. Cl. ...................... 345/419; 345/420; 345/426; 345/619; 345/629; 345/156; 345/653; 345/382; 345/154
(58) Field of Search ............................... 345/419, 420, 345/629, 709, 619, 156, 426, 653; 382/154

(56) References Cited

U.S. PATENT DOCUMENTS

| 5,990,895 A | * | 11/1999 | Fujii et al. .................. 345/419 |
| 6,125,197 A | * | 9/2000 | Mack et al. ................. 382/154 |
| 6,144,366 A | * | 11/2000 | Numazaki et al. .......... 345/156 |
| 6,144,388 A | * | 11/2000 | Bornstein ................... 345/629 |
| 6,167,253 A | * | 12/2000 | Farris et al. ............. 455/412.2 |
| 6,340,977 B1 | * | 1/2002 | Lui et al. ..................... 345/709 |
| 6,377,700 B1 | * | 4/2002 | Mack et al. ................. 382/154 |
| 6,414,679 B1 | * | 7/2002 | Miodonski et al. ......... 345/420 |
| 6,593,936 B1 | * | 7/2003 | Huang et al. ............... 345/619 |

FOREIGN PATENT DOCUMENTS

| JP | 02303900 | 12/1990 |
| JP | 4329470 | 11/1992 |
| JP | 06300539 | 10/1994 |
| JP | 9231413 | 9/1997 |
| JP | 10040422 | 2/1998 |
| JP | 10124704 | 5/1998 |
| JP | 10198824 | 7/1998 |
| JP | 10320589 | 12/1998 |
| JP | 11019335 | 1/1999 |
| WO | WO 98/15329 | 4/1998 |

* cited by examiner

Primary Examiner—Kimbinh T. Nguyen
(74) Attorney, Agent, or Firm—Pillsbury Winthrop Shaw Pittman LLP

(57) ABSTRACT

A three-dimensional model providing apparatus in which a customer can easily modify the input three-dimensional data. The apparatus comprises an input section (10) for inputting three-dimensional data, a server section (12) for managing the processes on the three-dimensional data from input to output, a providing section (14) for providing three-dimensional data, a communicating section for communicating the three-dimensional data between the input section, server section, and providing section, a receiving section (11) for receiving instruction contents from the customer, and a converting section (13) for modifying, processing, or converting the three-dimensional data according to the instruction contents.

43 Claims, 11 Drawing Sheets

3-D MODEL PROVIDING DEVICE

This application is the national phase of international application PCT/JP00/00930 filed Feb. 18, 2000 which was not published under PCT Article 21 (2) in English.

TECHNICAL FIELD

The present invention relates to a three-dimensional model providing apparatus for capturing an image of a target, generating a three-dimensional model of the target, and providing the data to a customer in a desired content.

BACKGROUND ART

For some years, three-dimensional scanners which can be used to obtain three-dimensional shape data and color information of various types of objects have been known. Various software for capturing the thee-dimensional data into a computer and converting it to a desired data format are also available. It is also known to output onto a desired recording medium and communicate via a network using peripheral devices of a computer.

However, because many of the three-dimensional scanners are large and expensive, they represent a major investment to purchasers, who general purchase a three-dimensional scanner for a special purpose. There has, therefore, been no means for ordinary users to scan or obtain three-dimensional data. Moreover, among the three-dimensional scanners, a method for obtaining three-dimensional shape data by scanning laser light onto a target in particular requires a long period of time for scanning and requires the object to be still for the entire duration of that scanning period. Because of this, it was difficult to obtain three-dimensional data of, for example, a living human being or other living or animated target.

Moreover, it is not always safe to irradiate laser light onto a person.

Furthermore, when a customer wishes to modify the input three-dimensional data, there has heretofore existed no system for the customer to easily transmit the three-dimensional data along with a modification request (desire) of the customer to a specialized modification processor.

DISCLOSURE OF THE INVENTION

The present invention was conceived to solve the above described problem and one object of the present invention is to provide a three-dimensional model providing apparatus which enables a general customer to freely create and use a three-dimensional model.

In order to achieve the object above, according to one aspect of the present invention, there is provided a three-dimensional model providing apparatus for supplying three-dimensional data of a target to a customer, the apparatus comprising an input section for inputting three-dimensional data; a server section for managing the three-dimensional data; a providing section for providing the three-dimensional data; and a communicating section for transceiving the three-dimensional data between the input section, server section, and providing section.

According to another aspect of the present invention, it is preferable that the three-dimensional model providing apparatus further comprises a receiving section for receiving instruction contents from the customer; and a converting section for modifying, processing, or converting the three-dimensional data based on the instruction contents.

According to another aspect of the present invention, it is preferable that the three-dimensional model providing apparatus further comprises an output section for confirming, visually or by audio, the input three-dimensional data or modified or processed three-dimensional data.

According to another aspect of the present invention, it is preferable that the output section is capable of three-dimensional display.

According to another aspect of the present invention, it is preferable that the input section produces three-dimensional shape data based on image data of the target captured from a plurality of directions.

According to another aspect of the present invention, it is preferable that the input section produces color data associated with the three-dimensional shape data based on image data of the target captured from a plurality of directions.

According to another aspect of the present invention, it is preferable that the input section produces three-dimensional shape data based on image data of the target captured from a plurality of directions by a plurality of cameras.

According to another aspect of the present invention, it is preferable that the input section produces color data associated with the three-dimensional shape data based on image data of the target captured from a plurality of directions by a plurality of cameras.

According to another aspect of the present invention, it is preferable that the input section includes a light irradiating section for irradiating light onto the target.

According to another aspect of the present invention, it is preferable that the input section comprises a light projection section for projecting light; a light reflecting section for reflecting light incident from the light projection section and projecting onto the target; a light receiving section for receiving light projected onto the target and reflected therefrom; and a modeling section for producing three-dimensional data of the target based on the received light data.

According to another aspect of the present invention, it is preferable that the light projection section is a surface light source for projecting a pattern light.

According to another aspect of the present invention, it is preferable that the input section comprises a light projection section for projecting light onto the target; a target image reflecting section for further reflecting light projected onto the target and reflected therefrom; a light receiving section for receiving the target image reflected at the target image reflecting section; and a modeling section for producing three-dimensional data of the target based on the received light data.

According to another aspect of the present invention, it is preferable that the instruction content from the customer received at the receiving section is a data format used when the three-dimensional data is provided by the three-dimensional model providing apparatus.

According to another aspect of the present invention, it s preferable that the instruction content from the customer received at the receiving section is modification and processing content to be applied to the three-dimensional data by the three-dimensional model providing apparatus.

According to another aspect of the present invention, it is preferable that the instruction content from the customer received at the receiving section is a data providing method designating the providing method of the three-dimensional data by the three-dimensional model providing apparatus.

According to another aspect of the present invention, it is preferable that the receiving section comprises a received content output section for outputting the instruction content from the customer and the identification information for identifying the customer.

According to another aspect of the present invention, it is preferable that the received content output section comprises one of a display-at-display section, an output-by-printing section, and an output-to-recording-medium section.

According to another aspect of the present invention, it is preferable that the converting section converts the three-dimensional data according to the data format.

According to another aspect of the present invention, it is preferable that the converting section modifies, processes, or converts the three-dimensional data according to the modification and processing contents.

According to another aspect of the present invention, it is preferable to manage operation progress condition of the providing section and the converting section, in addition to managing the three-dimensional data.

According to another aspect of the present invention, it is preferable that the three-dimensional model providing apparatus further comprises a communicating section, and the apparatus communicates, via the communicating section, the three-dimensional data, the instruction content from the customer, and identification information for identifying the customer to/from another three-dimensional model providing apparatus having a function equivalent to the converting section.

According to another aspect of the present invention, it is preferable that the three-dimensional model providing apparatus further comprises a communicating section, and the apparatus communicates, via the communicating section, three-dimensional data, instruction contents from the customer, and/or identification information for identifying the customer to/from another three-dimensional model providing apparatus having a function equivalent to the providing section.

According to another aspect of the present invention, it is preferable that the providing section comprises a recording medium selecting section capable of selecting an arbitrary recording medium from among at least one type of recording medium which are provided to the three-dimensional model providing apparatus in advance, and a recording medium writing section for writing three-dimensional data onto the recording medium.

According to another aspect of the present invention, it is preferable that the providing section comprises a recording medium writing section for writing the three-dimensional data onto a recording medium prepared by the customer.

According to another aspect of the present invention, it is preferable that the providing section comprises recording medium mailing means for mailing the recording medium.

According to another aspect of the present invention, it is preferable that the providing section sends the three-dimensional data to a providing section of another three-dimensional model providing apparatus via the communicating section.

According to another aspect of the present invention, it is preferable that the other three-dimensional model providing apparatus is an apparatus designated by the customer (referred to as a "designated apparatus" hereinafter).

According to another aspect of the present invention, it is preferable that the other three-dimensional model providing apparatus is a database server for managing access by the customer, in addition to accumulating and managing the three-dimensional data.

According to another aspect of the present invention, it is preferable that the three-dimensional data and unique information of the customer are communicated to/from the designated apparatus based on the data providing method.

According to another aspect of the present invention, it is preferable that the designated apparatus is capable of adding new information to the unique information.

According to another aspect of the present invention, it is preferable that the designated device is an entertainment device.

According to another aspect of the present invention, it is preferable that the designated apparatus is an entertainment device and the new information is the score evaluated by the entertainment device as a result of the entertainment.

According to another aspect of the present invention, it is preferable that the designated apparatus is an entertainment device and the new information is information for updating the three-dimensional data itself.

According to another aspect of the present invention, it is preferable that the three-dimensional model providing apparatus further comprises an information re-inputting section for re-reading the information with the new information added at the designated apparatus.

According to another aspect of the present invention, it is preferable that the designated apparatus is an entertainment device and the three-dimensional data recorded in the recording medium is used by an entertainment program of the entertainment device.

According to another aspect of the present invention, it is preferable that the designated apparatus is a database section and manages the input three-dimensional model and entertainment program.

According to another aspect of the present invention, it is preferable that the server section reads a model template of entertainment characters from the database section, and the input three-dimensional model is changed at the converting section based on the character model template.

According to another aspect of the present invention, it is preferable that the server section reads an entertainment program from the database section, and the input three-dimensional model is incorporated into the entertainment program at the converting section.

According to another aspect of the present invention, it is preferable that there exist a plurality of entertainment devices.

According to another aspect of the present invention, it is preferable that the plurality of entertainment devices are capable of communicating with each other.

According to another aspect of the present invention, it is preferable that the designated apparatus is a device connected to a network including a computer.

According to another aspect of the present invention, there is provided a three-dimensional model providing apparatus for supplying three-dimensional data of a target to a customer, the apparatus comprising an input section for inputting two-dimensional image data; a producing section for producing three-dimensional data from the two-dimensional image data; a server section for managing the three-dimensional data from input to output; a providing section for providing three-dimensional data; and a communicating section for communicating the three-dimensional data between the input section, producing section, server section, and providing section.

According to another aspect of the present invention, it is preferable that the two-dimensional image data is at least one portion of the target image data.

According to another aspect of the present invention, it is preferable that the two-dimensional image data is image data captured in accordance with a method for automatically producing three-dimensional data.

According to another aspect of the present invention, it is preferable that the communicating section is capable of communicating with an external network.

According to another aspect of the present invention, there is provided a three-dimensional model providing apparatus for supplying a three-dimensional model to a customer, the three-dimensional model obtained by combining at least two three-dimensional models, the apparatus comprising a database section capable of recording at least one three-dimensional model data; a controlling section for controlling the selection of three-dimensional model data recorded at the database section and the interface with a user; a data integrating section for integrating the selected three-dimensional model data; and a display section for displaying the three-dimensional model data.

According to another aspect of the present invention, it is preferable that the data integrating section changes the shapes of at least two three-dimensional model data to be integrated and then integrates the data.

According to another aspect of the present invention, it is preferable that the three-dimensional model providing apparatus further comprises a color changing section for changing color of the selected three-dimensional model data.

According to another aspect of the present invention, it is preferable that the display section is a display apparatus capable of three-dimensional display.

According to another aspect of the present invention, it is preferable that the three-dimensional model providing apparatus further comprises a communicating section capable of communicating with a database section via a network, and the three-dimensional model data is recorded in the database section.

According to another aspect of the present invention, it is preferable that a plurality of three-dimensional model data recorded at the database section are read and the read three-dimensional model data are integrated to produce three-dimensional data.

According to another aspect of the present invention, it is preferable that the three-dimensional model providing apparatus further comprises an optional function display section for allowing a customer to select an optional function.

According to another aspect of the present invention, it is preferable that the three-dimensional model providing apparatus further comprising a three-dimensional data modifying section for modifying the input three-dimensional data based on the selected optional function.

According to another aspect of the present invention, it is preferable that the optional function adds a pair of glasses to the input three-dimensional data.

According to another aspect of the present invention, it is preferable that the optional function changes the hair style of or adds hair to the input three-dimensional data.

According to another aspect of the present invention, it is preferable that the optional function assigns a color to each section.

According to another aspect of the present invention, it is preferable that the optional function adds an ornament to the input three-dimensional data.

According to another aspect of the present invention, it is preferable that the optional function changes the shape proportion of the three-dimensional data.

In order to achieve the object described above, according to another aspect of the present invention, there is provided a three-dimensional model providing method for supplying three-dimensional data of a target to a customer, the method comprising the steps of inputting three-dimensional data; managing the three-dimensional data at a server section; providing the three-dimensional data at a providing section; and transmitting/receiving the three-dimensional data between the input section, server section, and providing section, via a communicating section.

According to another aspect of the present invention, it is preferable that the three-dimensional model providing method further comprises a step of receiving instruction contents from the customer at a receiving section, and a step for modifying, processing, or converting the three-dimensional data based on the instruction contents at a converting section.

According to another aspect of the present invention, it is preferable that the three-dimensional model providing method further comprises the step of confirming, visually or by audio, the input three-dimensional data or modified or processed three-dimensional data at an output section.

According to another aspect of the present invention, it is preferable that the output section performs three-dimensional display.

According to another aspect of the present invention, there is provided a three-dimensional model providing method for supplying three-dimensional data of a target to a customer, the method comprising the steps of inputting two-dimensional image data; producing three-dimensional data from the two-dimensional image data; managing the three-dimensional data from input to output at a server section; providing three-dimensional data at a providing section; and transmitting/receiving the three-dimensional data between the input section, producing section, server section, and providing section, via a communicating section.

According to another aspect of the present invention, it is preferable that the two-dimensional image data is at least one image data of the target.

BRIEF DESCRIPTION OF DRAWINGS

FIG. 7 is a block diagram showing a structure when three-dimensional data is used with an entertainment device or the like.

BEST MODE FOR CARRYING OUT THE INVENTION

Figure 1:
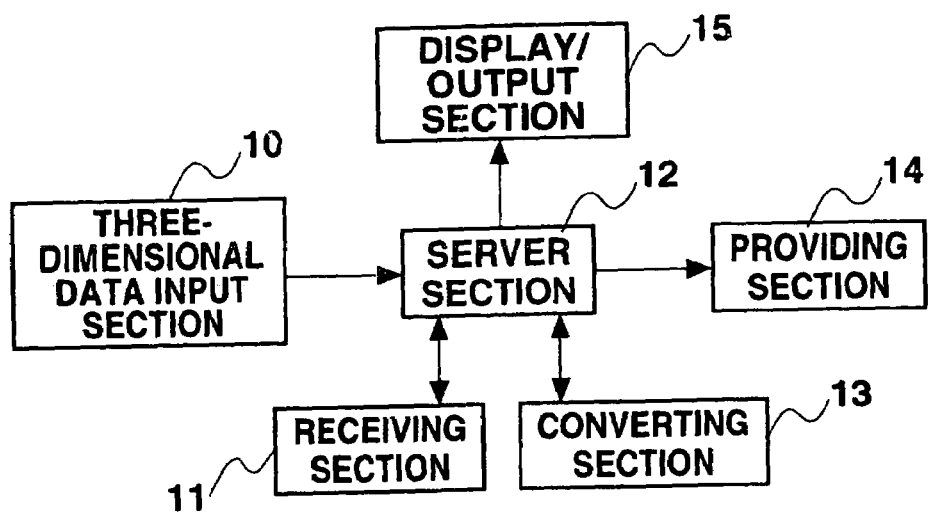
FIG. 1 is a block diagram showing a structure of one embodiment of the present invention.

Embodiments of the present invention will now be described referring to the drawings. FIG. 1 shows a structure of a three-dimensional model providing apparatus according to one embodiment of the present invention.

Figure 2:
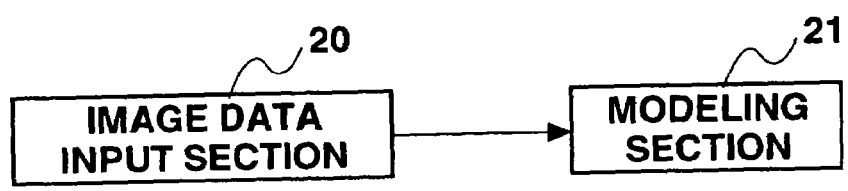
FIG. 2 is a block diagram showing a structure of the input section shown in FIG. 1.
Figure 3:
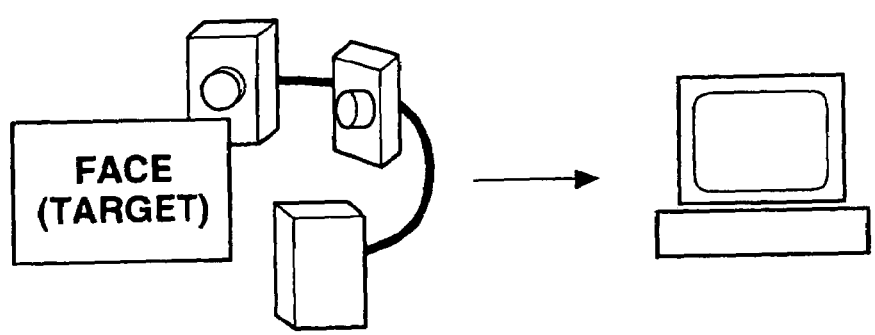
FIG. 3 is a conceptual diagram showing a structure of the input section.

A three-dimensional data input section 10 captures an image of a target such as a person or the face of a person, and produces three-dimensional data. The three-dimensional data input section 10 may be, for example, a three-dimensional data inputting apparatus as shown in FIGS. 2 and 3. An image data input section 20 captures an image of the target and produces image data. The image data input section 20 includes a plurality of fixed color CCD cameras, as shown in FIG. 3, and obtains color image data of the target at a plurality of different positions.

In the following descriptions, the term "three-dimensional shape data" refers to data of the three-dimensional shape information of the target, and may, in some cases, include the color information. The three-dimensional shape data is obtained by inputting an image at the data input section and performing a modeling process at a modeling section. When the data input section is a three-dimensional shape measurement device, the three-dimensional shape data may be obtained at the data input section. Moreover, data which is obtained by changing, modifying, integrating, and/or processing the obtained three-dimensional shape data is also referred to as three-dimensional shape data.

The color image data, including the color information, obtained by the image data input section 20 is input to a modeling section 21. The modeling section 21 includes a computer or the like, and performs three-dimensional modeling based on the plurality of image data of the target captured at the plurality of different positions, to obtain three-dimensional data of the target. The three-dimensional data includes the color data of the target. For the three-dimensional modeling, any method can be used such as, for example, a method disclosed in Japanese Patent Laid-Open Publication No. Hei 10-124704.

A display/output section 15 displays/outputs, visually or by audio, input three-dimensional data, confirmation of the reception process and reception content at a receiving section 11, confirmation of the three-dimensional data after processing at a converting section 13, and information at a providing section 14 (to be described later). The display of the three-dimensional data is possible using a display which is capable of three-dimensional display.

Figure 4:
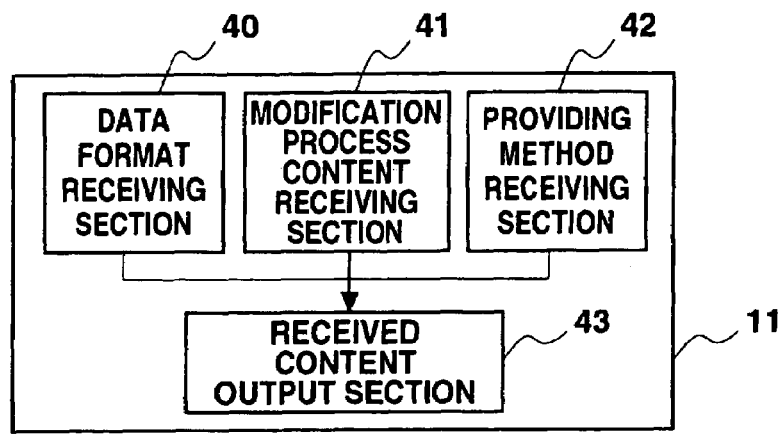
FIG. 4 is a block diagram showing a structure of the receiving section shown in FIG. 1.

As shown in FIG. 4, the receiving section 11 includes one of a data format receiving section 40 for receiving a data format to be used when three-dimensional data is provided to the customer from the three-dimensional model providing apparatus, a modification process content receiving section 41 for receiving the content of the modification processing of the data when providing the three-dimensional data, and a providing method receiving section 42 for receiving the method for providing the three-dimensional data, and a received content output section 43 for outputting the received contents and customer identification information required when providing the data. The received content output section 43 includes a display-at-display section, an output-by-printing section, and an output-to-recording-medium section. The display-at-display section can also be a display section 15.

The data format at the data format receiving section 40 can be, for example, general three-dimensional model description format, a game compatible format which can be input into a game program, a network compatible format where data amount is compressed for network communication, or a security compatible format used for personal authentication. When a security compatible format is selected, personal information of the customer is received and the three-dimensional data including the personal information is provided. In such a case, it is preferable to not only encrypt the three-dimensional data of the target, but also to include the personal information for encryption.

The modification process content receiving section 41 designates the content of the modification processing desired by the customer such as, for example, modification of the input three-dimensional data for better looks, deformation of the input data so that the characteristics are emphasized, or modification of the input data so that it is more animation-like.

At the providing method receiving section 42, the customer designates the method for providing the input three-dimensional data to the customer. Examples of such methods include a recording medium prepared at the three-dimensional model providing apparatus in advance and a recording medium prepared by the customer. In this case, because the a great variety of recording mediums are currently in use, it is preferable that the type of the input recording medium be detected automatically. It is also possible to provide the recording medium to the customer by mail. In this case, the destination information such as the address to which the medium is to be mailed is also received.

In addition, there also exists a method for directly transferring to the computer or the mobile terminal (for example, PDA, PHS, or portable phone) that the customer possesses, using communication means. In this case, the type of communication (protocol) and information of the communication destination (address) are received.

Moreover, there also exists a method for providing the three-dimensional data to the customer by transferring the data to a server on a network and allowing the customer to access the server. In this case, identification information such as a number or a password for identifying the customer when accessing can be received or issued at a providing section 14 of the three-dimensional model providing apparatus.

A server section 12 manages the data from input to output of the three-dimensional data, schedules the processes, and/or prepares data suited for the method for providing the thee-dimensional data to the customer.

The converting section 13 includes at least one of a modification processing section for modify processing according to the content designated by the customer at the modification process content receiving section 41 or a data converting section for converting the three-dimensional data to be provided into a data format received from the customer at the data format receiving section 40. The converting section 13 can be placed within the three-dimensional model providing apparatus or within a three-dimensional model providing apparatus located at a different location by communication means such as a network, in which case the three-dimensional data is transmitted via communication. The apparatus at different location in this case can be a server, in which case, a particular processing operator accesses the server, transmits and receives data, and processes the data. Moreover, the modification processing section and the data converting section can also be independently provided. In such a case, it is preferable to allow the data to be interchanged by a network or a recording medium.

Figure 5:
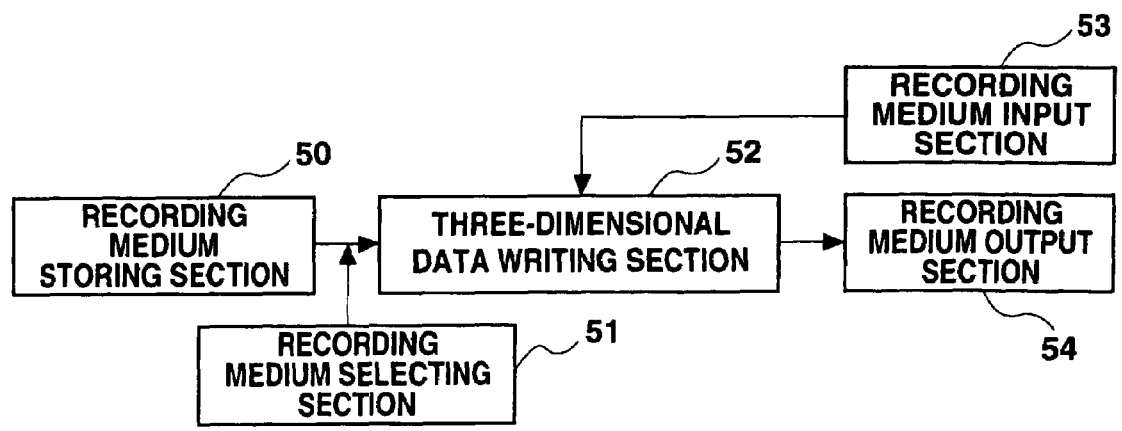
FIG. 5 is a block diagram of a flow of a recording medium at the providing section.

FIG. 5 shows a sequence of processes at the providing section 14 such as writing the three-dimensional data onto the recording medium.

A desired recording medium is selected at a recording medium selecting section 51 from among recording media pre-provided at a recording medium storing section 50. The final data is written onto the selected recording medium at a three-dimensional data writing section 52. By outputting the recording medium at a recording medium output section 54, the recording medium can be provided to the customer. Alternatively, a recording medium prepared by the customer can be input to a recording medium input section 53, and, by writing the three-dimensional data, the recording medium can be provided to the customer. During this process, it is preferable to automatically identify the type of the input recording medium at the recording medium input section 53.

Examples of the recording medium include a magnetic card, a card type memory, a floppy disk, a magnetic disk, CD-R/RW, and a security card for authentication. It is also possible to provide these recording media by mail or by a door-to-door delivery service. In such a case, it is preferable to send the data to a providing section near the mail destination via a network, output the recording medium there, and mail or allow the customer to return and collect the recording medium at that location, because in any of these ways delivery costs can be reduced.

Figure 6:
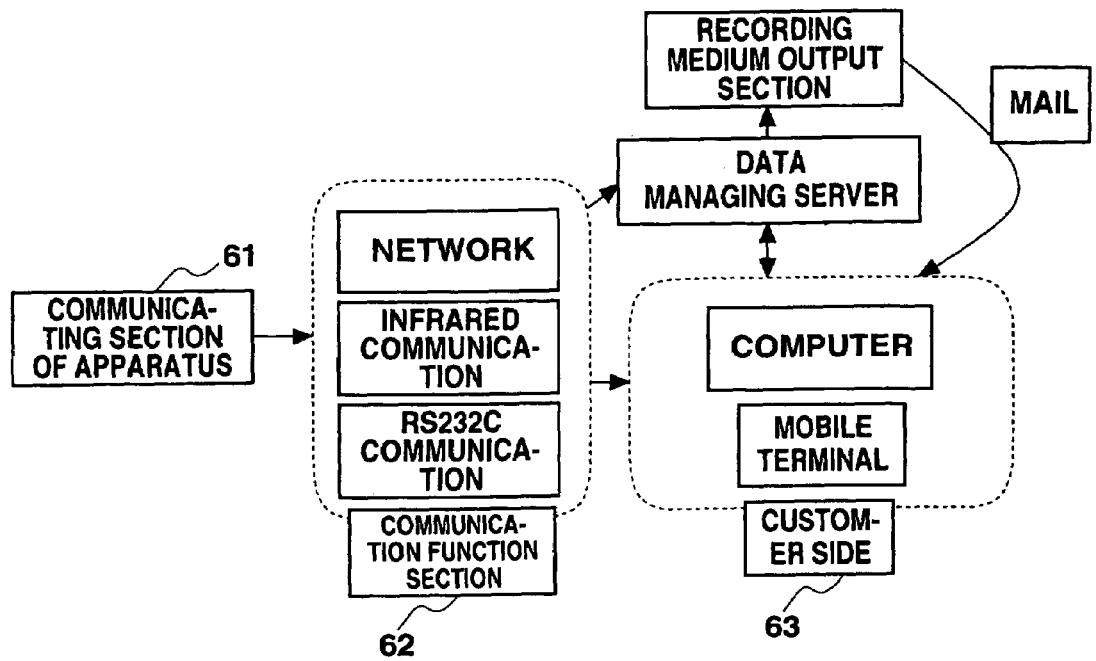
FIG. 6 is a block diagram showing a flow of three-dimensional data at the providing section.

FIG. 6 shows a flow of the recording medium or the three-dimensional data.

A communicating section 61 of the three-dimensional model providing apparatus includes a communication function section 62 of infrared and RS-232C, and transmits the three-dimensional data to the mobile terminal of the customer. Also, the communicating section 61 connects to a network via, for example, an Ethernet, a phone line, ISDN, satellite communication, or digital broadcast, and transmits the three-dimensional data to the destination designated by the customer. The destination that can be designated by the customer includes a computer at home and a server on a network. The transmission method includes electronic mail and file transfer. When the data is to be accumulated at a server on a network by transferring an electric mail or file, the customer can receive, at the receiving section 11, identification information for identifying the customer when the customer accesses the server from his computer or mobile terminal 63, or such identification information can be issued at the providing section 14 and provided to the customer.

Figure 7:
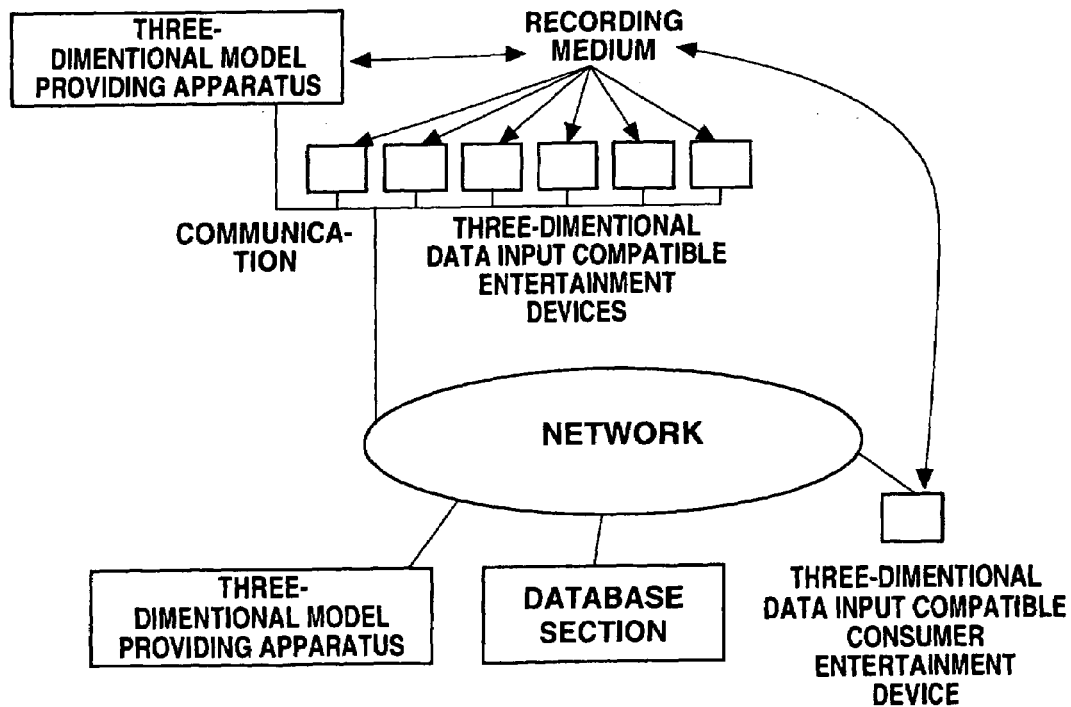

FIG. 7 shows a flow of data such as the three-dimensional data and entertainment program when the provided three-dimensional data is used at various entertainment devices in a case where a game compatible format is designated at the data format receiving section 40.

Here, a target input by a customer, for example, a face or a body of the customer, or a character created by the customer can be input to a three-dimensional data input compatible entertainment device as a character for the game and play the game. The three-dimensional data is output by a method designated by the customer at the providing method receiving section 42 or output by a providing method suited for connection configuration of the entertainment device. This configuration also enables fitting of the input three-dimensional data into the unique input format of the entertainment device as a character by transmitting/receiving with a database server for managing the entertainment program or character data, and entertainment using three-dimensional data of the target input by an entertainment device other than the three-dimensional data input compatible entertainment device by incorporating into the program itself.

As a result of the entertainment at the entertainment device, the obtained score or the results and score can be transmitted/received with a three-dimensional model providing apparatus via a recording medium or a communication medium. By reflecting the obtained score or the like when the three-dimensional data is modified or changed, it is possible to improve the fun of the entertainment. For example, the character's face can be beautified or the muscles can be strengthened when a high score or good results are achieved.

In addition, by providing in advance materials in the apparatus that can be processed and that are needed for creating a character, it is possible to provide data satisfying the customer's specific demands.

Figure 8:
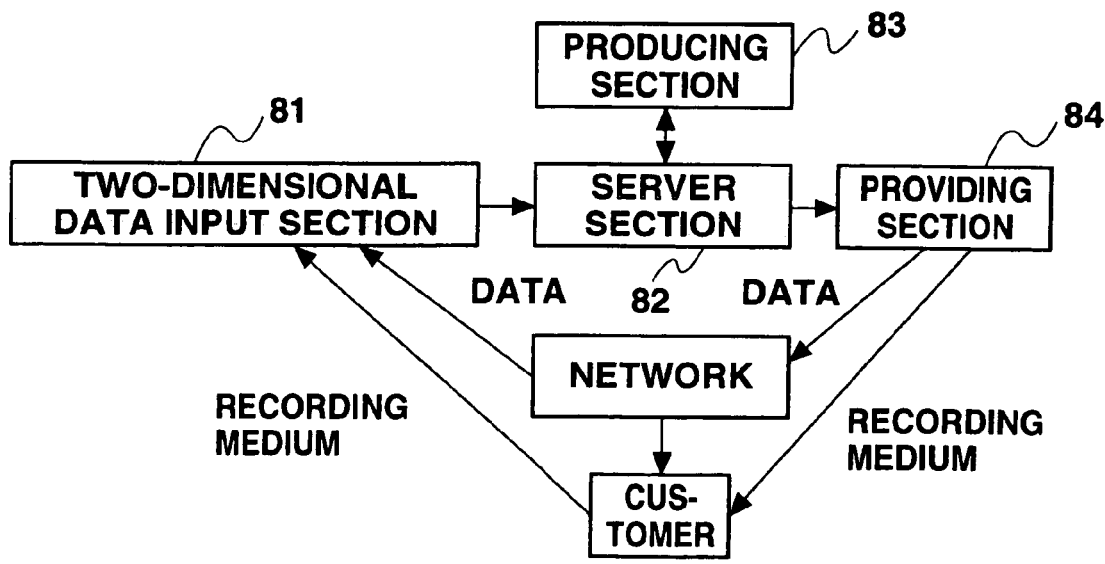
FIG. 8 is a block diagram showing a structure when three-dimensional data is produced from two-dimensional image data.

FIG. 8 is a diagram showing a case where three-dimensional data is produced from two-dimensional image data of the target and then provided to the customer. The customer sends the two-dimensional image data obtained by capturing the image of the target for which three-dimensional data is desired from a two-dimensional image data input section 81 to a server section 82 via a recording medium or a communication medium such as a network, and inputs into the three-dimensional model providing apparatus. The input two-dimensional image data is sent to a producing section 83 where the three-dimensional data is produced. The three-dimensional data produced at the producing section 83 is provided to the customer at a providing section 84. The producing section 83 can be connected to the server section 82 via, for example, a network where the transmitted two-dimensional data is displayed and a specialized operator can manually create the three-dimensional data based on the two-dimensional image data. It is possible to realize an effective three-dimensional model providing apparatus by managing the transmission/reception of the data and the progress conditions for the operations of the producing section 83 at the server section 82.

Efficiency can be further improved when the input two-dimensional image data is an image captured in a condition where the data can be automatically converted into three-dimension, more specifically, a case where there are a plurality of images and the positional relationship between the cameras which captured the images are known, due to the possibility of automatic three-dimensional data production.

Figure 9:
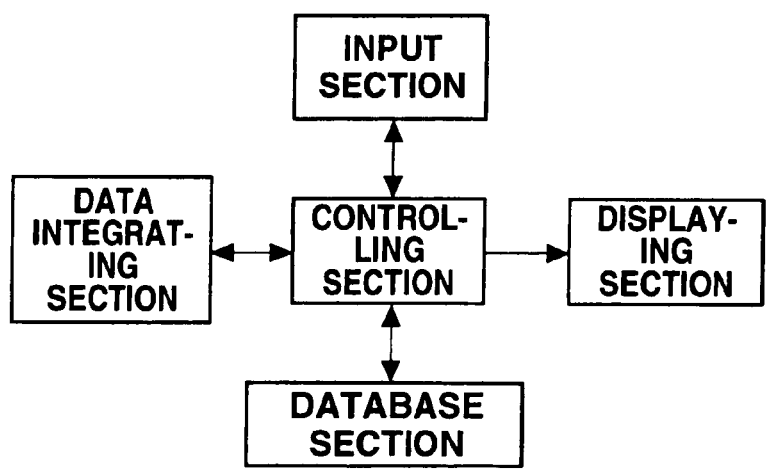
FIG. 9 is a block diagram showing a structure for realizing an integration function of three-dimensional data.

FIG. 9 shows a configuration for realizing an integrating function of the three-dimensional data according to another embodiment of the present invention. By selecting some of the three-dimensional data input at the input section (including the three-dimensional data provided by the customer) and from three-dimensional data registered in a database section, a plurality of three-dimensional data can be integrated when necessary and the integrated result can be confirmed at a display section. For example, input three-dimensional data of a human head section provided by the customer can be integrated with three-dimensional data of a body wearing a piece of clothing pre-registered in the database section. During this process, by changing some of the used three-dimensional data with a reference at one of the data size, integration with overall good balance can be achieved.

As another example, input three-dimensional data of a human body with no cloth can be integrated with the three-dimensional data of a piece of clothing in order to simulate dressing. During this process, by altering the cloth data to fit the human body, or by altering the human body according to the characteristic of the cloth, it is possible to simulate trying-on of clothing. The three-dimensional data registered in the database not only includes clothes, but also ornaments such as glasses and accessories, and styling elements such as hair style, makeup, and proportion. By selecting among these elements, the three-dimensional data can be arbitrarily modified.

By providing the database section on a network so that it can be communicated with the other three-dimensional model providing apparatuses, the three-dimensional data can be managed at once, resulting in improvements in efficiency, and thus, increase in the number of three-dimensional data that are registered. By enabling registration and management of the input three-dimensional data at the database, the number of types can be further increased, resulting in more convenient configuration.

"Structure of the three-dimensional data input section (image data input section and modeling section (refer to FIG. 2))"

The data input section 20 captures an image of a target using a camera. In order to obtain three-dimensional shape data, it is generally required to obtain a plurality of image data from a plurality of directions for one immovable target. It is therefore preferable to affix a plurality of cameras at predetermined positions and simultaneously capture images of the target. It is however also possible to moveably mount a camera on a rail and obtain a plurality of image data by moving the camera.

Figure 10:
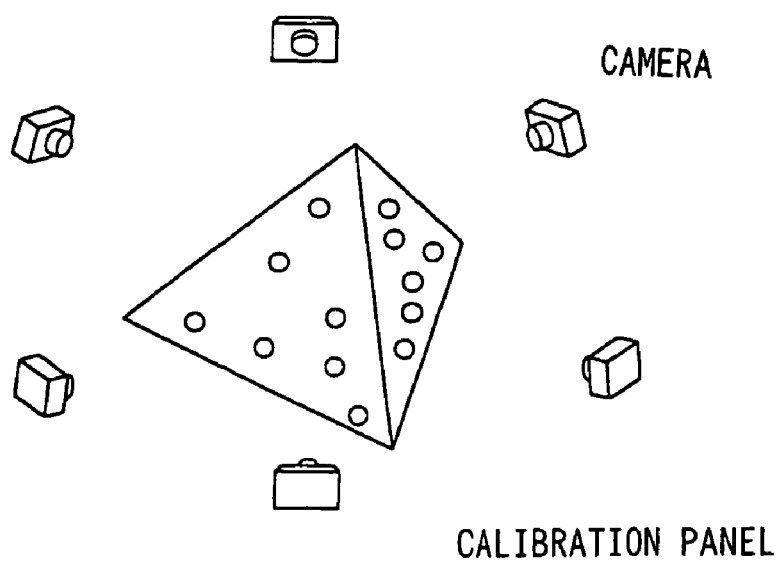
FIG. 10 is a diagram showing calibration.

Reliable detection of the absolute positions of the plurality of fixed cameras are required, but in general this may be difficult with the mechanical means. To this end, as shown in FIG. 10, it is preferable to place a reference object with a predetermined pattern drawn in the camera view and to perform calibration of camera position based on the image data of the reference object. In this manner, the position of the camera can be accurately detected with a simple mounting of camera. It is preferable to perform the calibration periodically, e.g. on daily basis or on weekly basis.

Figure 11:
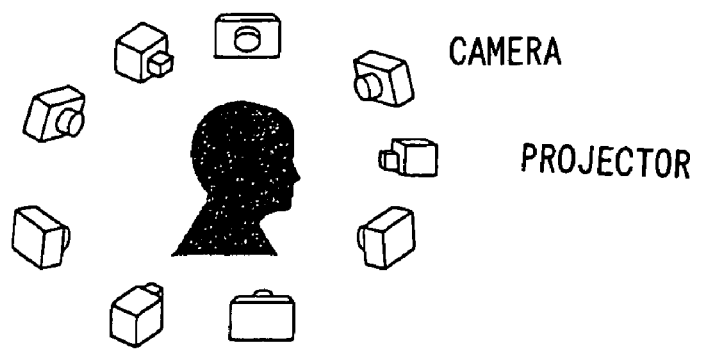
FIG. 11 is a diagram showing a structure for projecting a random pattern.
Figure 12:
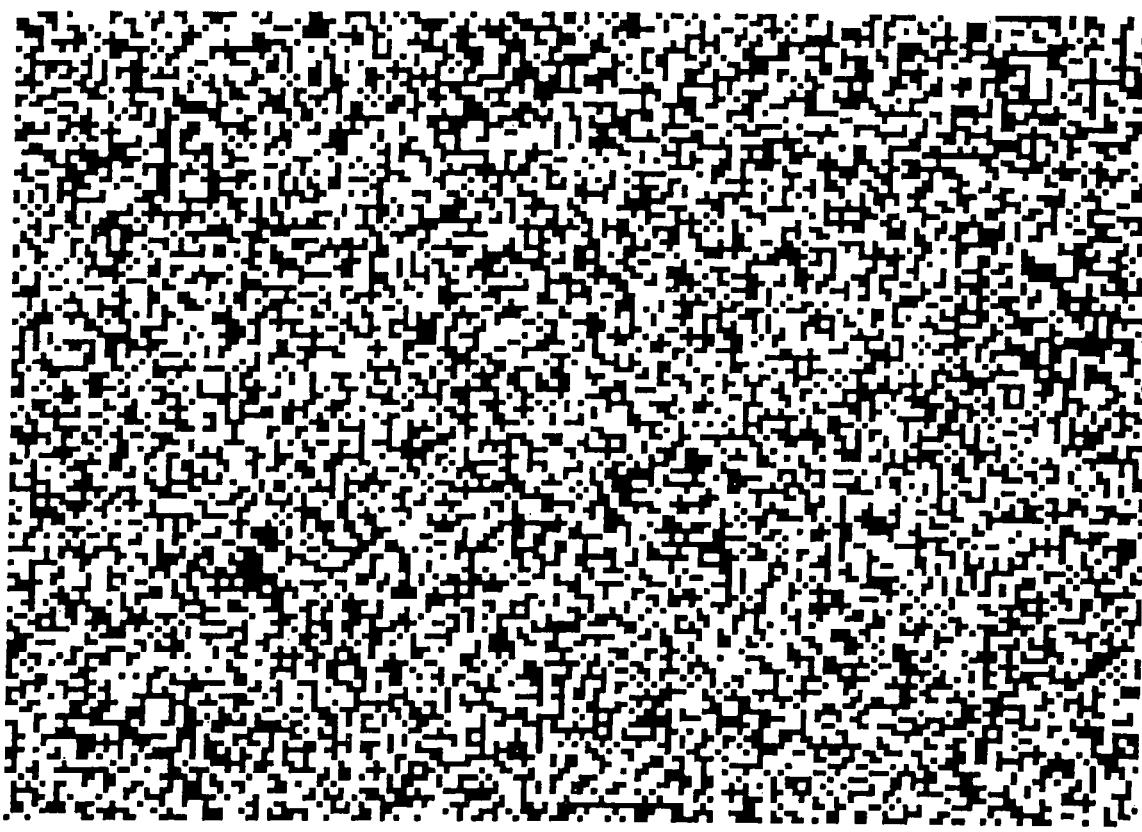
FIG. 12 is a diagram showing an example of a random pattern.

In order to accurately obtain the three-dimensional shape data of the target, each of the sections of the target must be seen differently from a plurality of directions. As shown in FIG. 11, it is preferable to project a predetermined pattern onto the target using a projector. In this manner, an accurate three-dimensional shape data can be obtained even for sections that have uniform colors or where color differences are small. The pattern can be removed from the color data by data process or, alternatively, the color data can be obtained from the captured data in a case where the pattern is not projected. As the projection pattern, a random pattern as shown in FIG. 12 can be preferably used.

When three-dimensional data is obtained using such a random pattern, a high-precision modeling can be performed even for the convex sections by obtaining depth data using a stereo method with a plurality of cameras.

As the camera, it is preferable to use a camera with a wide-angle lens. This enables provision of the camera in a relatively small space.

The data input section 20 captures an image of a target by a camera and extracts the target area in the image. It is therefore preferable to use a constant background color to facilitate the clipping of the target area.

For example, it is preferable to provide a room with all four walls having a uniform color and place the target at the center section of the room. In particular, when the target is a person, it is preferable to provide a chair at the center section and let the person sit on the chair. Also, in a case of a person, the image from the back side is relatively unimportant.

Thus, it is preferable to provide an entrance at one wall of the room and let the person sit facing this entrance, while unifying the colors of the walls except for the entrance side. For a person, it is also preferable to omit the image data from the back side.

When the target and the background have the same color, the clipping becomes difficult. It is therefore preferable to allow a change in the background color (the color of the room walls). For example, by projecting a light ray of predetermined color from outside using a projector, the wall color can be changed.

Moreover, it is also preferable to change at least two colors in the background color, obtain image data at the two types of background colors, and clip the target area in the image by the sum of the extraction results at both background colors. In this manner, the target area can be reliably clipped for any target color.

Furthermore, it is preferable to provide illumination devices at the four corners of the room and light up the room so that there will be no shadow on the target, in order to unify the illumination for the target.

"Others"

When a pet such as a dog is the target, it is necessary to restrain the pet. It is preferable to provide a chain at the image capturing station. In this case, by unifying the color of the chain and the background, it is possible to facilitate extraction of the target in the captured image data.

Figure 13:
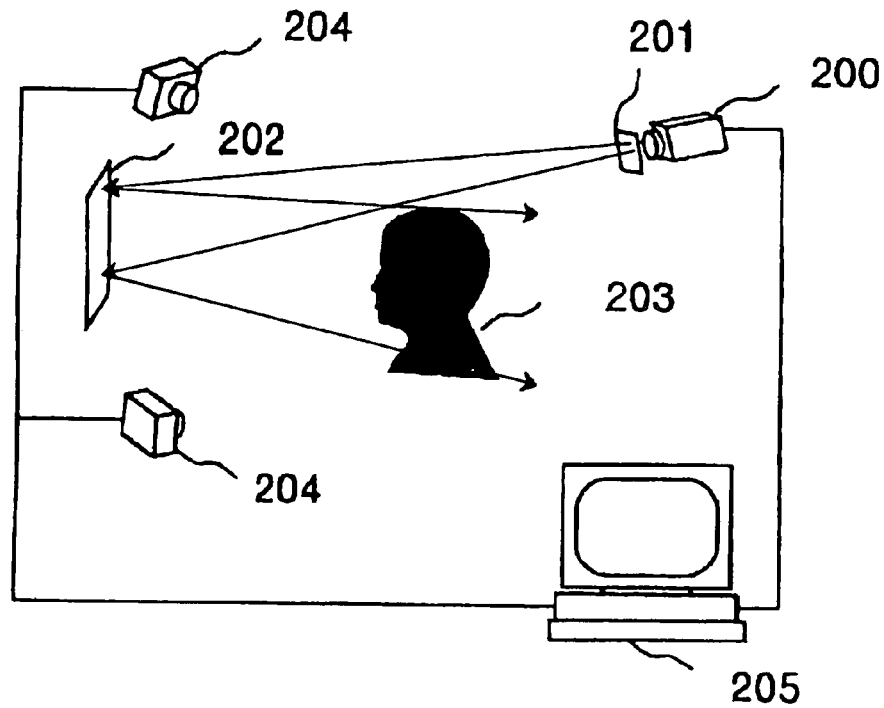
FIG. 13 is a diagram showing a structure of a three-dimensional data producing apparatus according to another embodiment of the present invention.

FIG. 13 shows a structure of a three-dimensional data producing apparatus at an input section 10 according to another embodiment of the present invention.

A light projection section 200 projects a random pattern, slit pattern, or coded pattern assigned on a panel 201 onto a target such as, for example, a person or a person's face. The projected pattern light is projected onto the target 203 after reflecting at a reflecting section 202.

The target image with the pattern light projected is captured at an image input section 204 such as a CCD camera and the three-dimensional data of the target is produced at a modeling section 205 from a plurality of obtained images by the method already described.

Figure 14A:
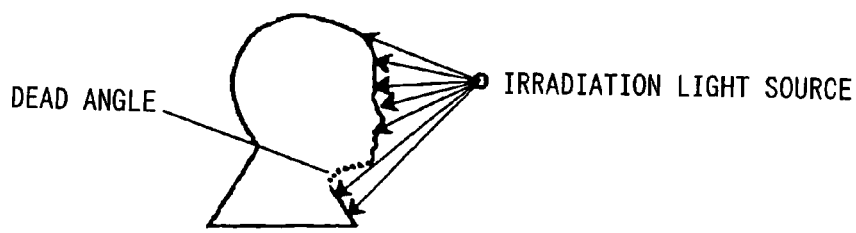
FIGS. 14(a) and (b) are diagrams explaining positions of an illumination light source.

When the distance from the light source of the light projection section 200 to the target is small and the pattern is directly projected onto the target, there will be sections where the pattern is not projected due to the shadow of the target itself. In other words, there will be portions which cannot be seen from the light source. In the case shown in FIG. 14(a), the pattern is not projected onto a part of the neck due to the shadow of the chin.

Thus, the shape measurement of such part will either be very difficult or inaccurate.

Figure 14B:
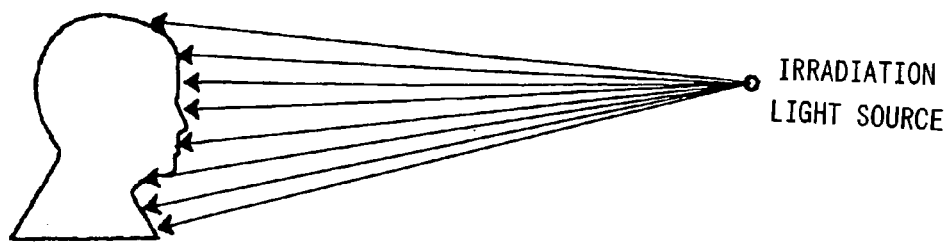

In order to minimize such possibility of a blind spot, the distance between the light source and the target can be set at a sufficiently large distance, as shown in FIG. 14(b). However, this configuration will result in a very large overall size of the apparatus.

Therefore, the projection pattern is projected onto the target after being reflected at the reflecting section 202.

In this manner, it is possible to increase the distance of the light path from the light projection section 200 to the target while preventing the overall size of the apparatus from becoming large.

It is also possible to irradiate a laser ray in place of the pattern light from the light projection section 200 as described above. A laser ray irradiating device has a basic structure as shown in FIG. 15.

Figure 15A:
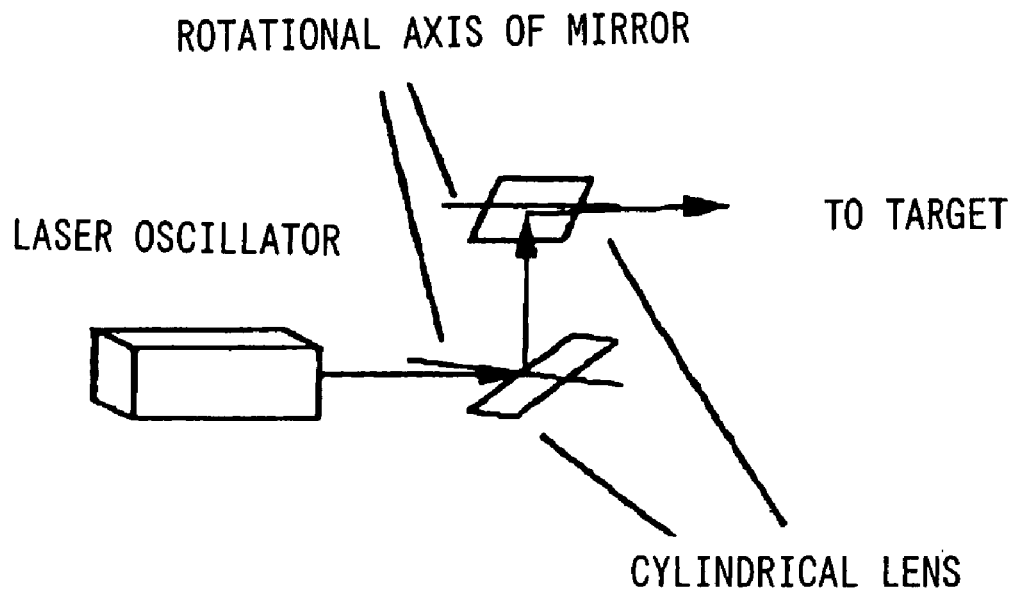
FIGS. 15(a) and (b) are diagrams explaining a laser irradiating device.

Specifically, a two-dimensional scan is enabled in the configuration shown in FIG. 15(a) by changing the progress direction of the beam-type laser ray using a galvano mirror or a polygon mirror.

Figure 15B:
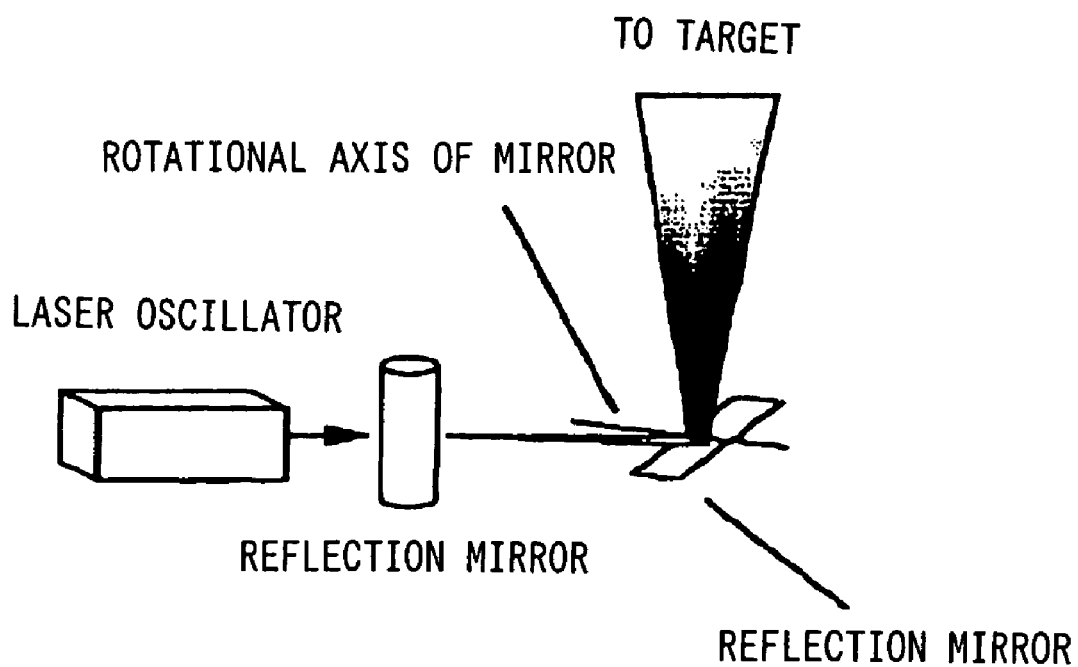

In the configuration shown in FIG. 15(b), a two-dimensional scan is enabled by changing the beam-type laser ray into a slit light by a cylindrical lens and changing the progress direction of the slit light using a galvano mirror or a polygon mirror.

Even in the above-described cases, if the distance to the target is insufficient, the problem of the blind spot will be generated, as also described above. Therefore, a method for increasing the light path using a reflecting section is useful from the view of reducing the blind spots.

Figure 16A:
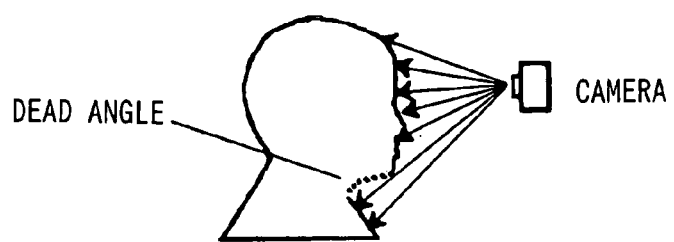
FIGS. 16(a) and (b) are diagrams explaining camera positions for avoiding blind spots.
Figure 16B:
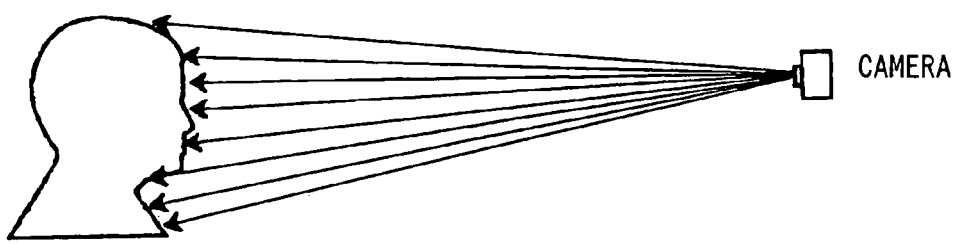

Similarly, problematic blind spots are also generated during the input of an object with the pattern projected. For example, as shown in FIG. 16(a), when capturing an image of a pattern-projected object using a CCD camera, it is not possible to input the portion of the neck that is blocked by the chin for the same reason as described above. As shown in FIG. 16(b), the distance from the camera to the target can be set at a sufficiently large distance using a lens with a longer focal length. However, this configuration will again result in a very large overall size of the apparatus.

Thus, the image of the pattern-projected target reflected at the reflecting section is captured by the camera. In this manner, it is possible to elongate the distance from the target to the camera while preventing the overall size from becoming too large. This configuration can minimize blind spots.

Figure 17:
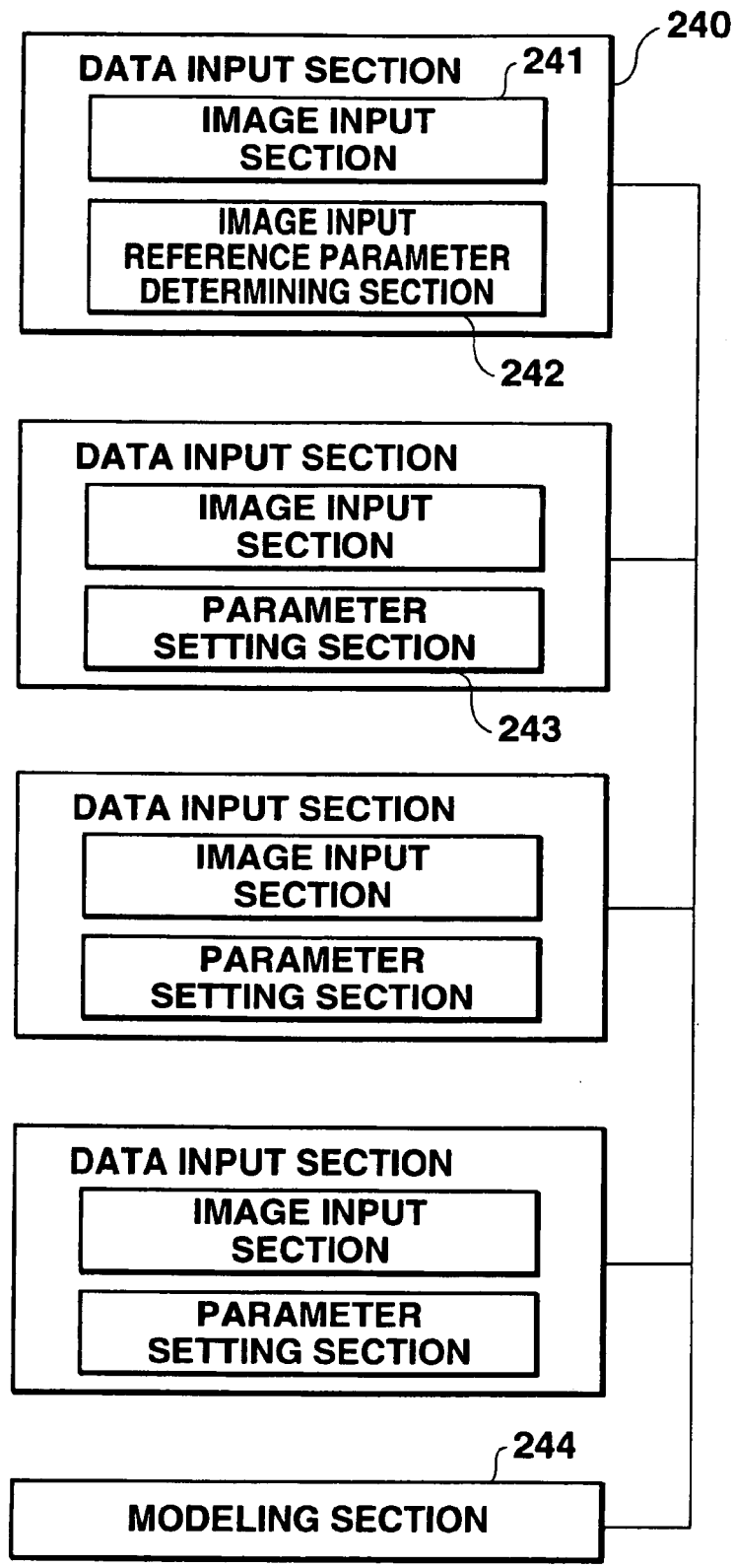
FIG. 17 is a diagram showing a structure of a three-dimensional data producing apparatus according to another embodiment of the present invention.

FIG. 17 shows a structure of a three-dimensional data producing apparatus according to another embodiment of the present invention.

A plurality of data input sections 240 are present for capturing an image of a target from a plurality of directions and inputting image data. A data input section 240 includes an image input section 241. As the image input section 241, an analog or digital color CCD camera or the like may be employed.

A portion of the data input sections includes a data input reference parameter determining section 241 for suitably determining the parameters during the data input, such as, for example, white, balance, exposure, etc.

Each of the other data input sections, on the other hand, includes a parameter setting section 243 for setting the parameters to the parameters determined at the data input reference parameter determining section. At these data input sections, images are input based on the set parameters.

At a modeling section 244, three-dimensional data of the target is calculated based on a plurality of images obtained at the data input sections. The modeling process can be performed by, for example, the method described in Japanese Patent Laid-Open Publication No. Hei 10-124704.

Figure 18:
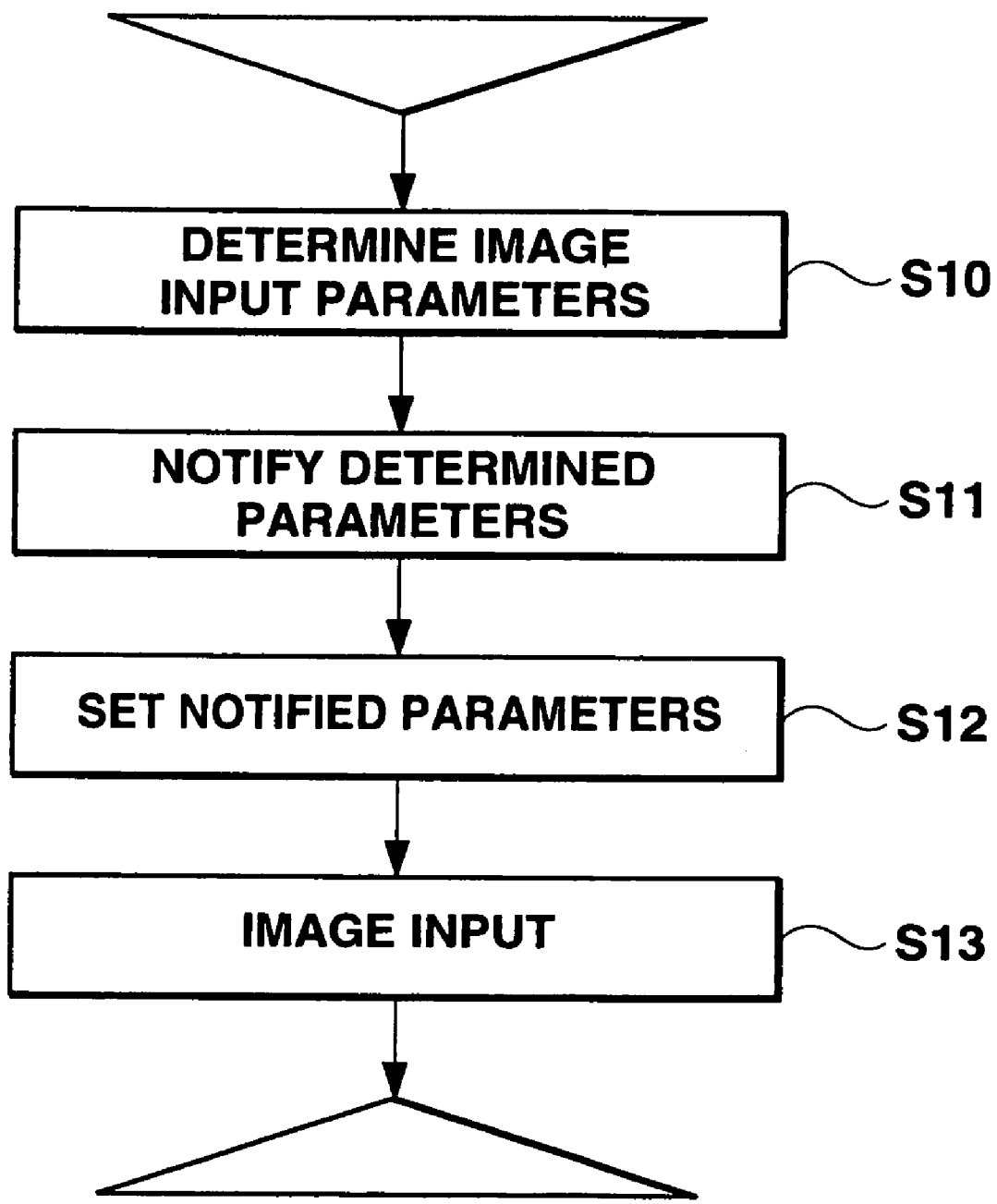
FIG. 18 is a diagram showing a flow of data input.

The flow of the data input will now be described referring to FIG. 18.

The parameters such as the white balance and exposure are automatically determined at one data input section (step S10). This can be easily accomplished using functions such as auto-white balance and auto-exposure which are commonly provided in electronic cameras.

The determined parameters are then notified to the other data input sections (step S11).

At each data input section, the notified parameters are set at the internal parameter setting section of the data input section (step S12). In other words, at these data input sections, the parameters are not automatically set, but are set by the parameters notified from outside.

The images are input at all data input sections based on the set parameters (step S13).

In this manner, by setting the parameters determined at one data input section as common parameters and by inputting images at all data input sections based on the common parameters, it is possible to input images with constant quality.

In contrast, if each data input section separately sets suitable parameters, different values will be set as the suitable parameters due to the reasons such as (1) the sections of the target seen from each input section are different, and (2) the background sections (area other than the target area) seen from each input section are different.

Because of this, the color of one section, which should be constant from one data input section to another, will vary. This will pose a serious problem when a single set of three-dimensional object data is ultimately produced. However, by determining one set of reference parameters and using the reference parameters as common parameters, images can be input satisfying the condition that all areas of one section will have a uniform color.

Here, a case is shown where the reference parameters are automatically determined at one data input section. It is also possible for an operator to decide the reference parameters. There are also cases where an operator wishes to set a more suitable set of parameter values other than the values automatically determined at the data input section, based on his experience or for a special effect. In such cases, manual setting is preferable.

In the above example, a case is described where three-dimensional data of the target is created. The present method can also be applied for creating pseudo-three-dimensional shape data of the target such as QuickTime VR. Using the present method, a problem where the hue changes when the target is rotated and displayed can be avoided.

As described, according to the present invention, three-dimensional data for a target can be automatically produced and provided with desired content designated by a user.

What is claimed is:

1. A three-dimensional model providing apparatus for supplying three-dimensional data of a target to a customer, said apparatus comprising:

an input section for inputting three-dimensional data, wherein said input section comprises:

a light projection section for projecting light, said light projection section including a surface light source for projecting a light pattern, a light reflecting section for reflecting the light pattern incident from said light projection section and projecting the light pattern onto the target, a target image reflecting section for reflecting a target image formed from the light pattern projected onto the target, a light receiving section for receiving the target image reflected at said target image reflecting section, and a modeling section for producing three-dimensional data of said target based on the received target image;

a server section for managing the three-dimensional data;
a providing section for providing the three-dimensional data; and
a communicating section for communicating said three-dimensional data between said input section, said server section, and said providing section.

2. A three-dimensional model providing apparatus of claim 1, further comprising:
a receiving section for receiving instruction contents from the customer; and
a converting section for modifying, processing, or converting said three-dimensional data based on said instruction contents.

3. A three-dimensional model providing apparatus of claim 1, further comprising:
an output section for confirming, visually or by audio, the input three-dimensional data or modified or processed three-dimensional data.

4. A three-dimensional model providing apparatus of claim 3, wherein said output section is capable of three-dimensional display.

5. A three-dimensional model providing apparatus of claim 1, wherein said input section produces three-dimensional shape data based on image data of the target captured from a plurality of directions.

6. A three-dimensional model providing apparatus of claim 1, wherein said input section produces color data associated with said three-dimensional shape data based on image data of the target captured from a plurality of directions.

7. A three-dimensional model providing apparatus of claim 1, wherein said input section produces three-dimensional shape data based on image data of said target captured from a plurality of directions by a plurality of cameras.

8. A three-dimensional model providing apparatus of claim 1, wherein said input section produces color data associated with said three-dimensional shape data based on image data of said target captured from a plurality of directions by a plurality of cameras.

9. A three-dimensional model providing apparatus of claim 2, wherein said instruction content from the customer received at said receiving section identifies a data format to be used when the three-dimensional data is provided by said three-dimensional model providing apparatus.

10. A three-dimensional model providing apparatus of claim 2, wherein said instruction content from the customer received at said receiving section is modification and processing contents to be applied to the three-dimensional data by said three-dimensional model providing apparatus.

11. A three-dimensional model providing apparatus of claim 2, wherein said instruction content from the customer received at said receiving section is a data providing method designating the providing method of the three-dimensional data by said three-dimensional model providing apparatus.

12. A three-dimensional model providing apparatus of claim 2, wherein said receiving section comprises a received content output section for outputting the instruction content from the customer and the identification information for identifying the customer.

13. A three-dimensional model providing apparatus of claim 12, wherein said received content output section comprises one of a display-at-display section, an output-by-printing section, and an output-to-recording-medium section.

14. A three-dimensional model providing apparatus of claim 9, wherein said converting section converts said three-dimensional data according to said data format.

15. A three-dimensional model providing apparatus of claim 10, wherein said converting section modifies, processes, or converts said three-dimensional data according to said modification and processing contents.

16. A three-dimensional model providing apparatus of claim 1, wherein said server section manages operation progress condition of said providing section and said converting section, in addition to managing said three-dimensional data.

17. A three-dimensional model providing apparatus of claim 1, further comprising a communicating section, wherein said apparatus communicates, via said communicating section, said three-dimensional data, said instruction contents from the customer, and identification information for identifying the customer to/from another three-dimensional model providing apparatus having a function equivalent to said converting section.

18. A three-dimensional model providing apparatus of claim 1, further comprising a communicating section, wherein said apparatus communicates, via said communicating section, three-dimensional data, the content of an instruction from the customer, and/or identification information for identifying the customer to/from another three-dimensional model providing apparatus having a function equivalent to said providing section.

19. A three-dimensional model providing apparatus of claim 1, wherein said providing section comprises:
a recording medium selecting section capable of selecting a recording medium from among one or more types of recording medium provided to said three-dimensional model providing apparatus in advance; and
a recording medium writing section for writing three-dimensional data onto the recording medium.

20. A three-dimensional model providing apparatus of claim 1, wherein said providing section comprises a recording medium writing section for writing the three-dimensional data onto a recording medium prepared by the customer.

21. A three-dimensional model providing apparatus of claim 1, wherein said providing section comprises recording medium mailing means for mailing the recording medium.

22. A three-dimensional model providing apparatus of claim 1, wherein said providing section provides said three-dimensional data to a providing section of another three-dimensional model providing apparatus via said communicating section.

23. A three-dimensional model providing apparatus of claim 22, wherein said other three-dimensional model providing apparatus is a designated apparatus designated by the customer.

24. A three-dimensional model providing apparatus of claim 22, wherein said other three-dimensional model providing apparatus is a database server for managing access by the customer, in addition to accumulating and managing said three-dimensional data.

25. A three-dimensional model providing apparatus of claim 11, wherein said three-dimensional data and unique information of the customer are communicated to/from the designated apparatus based on said data providing method.

26. A three-dimensional model providing apparatus of claim 25, wherein said designated apparatus is capable of adding new information to said unique information.

27. A three-dimensional model providing apparatus of claim 25, wherein said designated device is an entertainment device.

28. A three-dimensional model providing apparatus of claim 26, wherein said designated apparatus is an entertainment device and said new information is a score determined by the entertainment device as a result of the entertainment.

29. A three-dimensional model providing apparatus of claim 26, wherein said designated apparatus is an entertainment device and said new information is information for updating the three-dimensional data.

30. A three-dimensional model providing apparatus of claim 26, further comprising an information re-inputting section for re-reading the information with the new information added at said designated apparatus.

31. A three-dimensional model providing apparatus of claim 25, wherein said designated apparatus is an entertainment device and the three-dimensional data recorded in said recording medium is used by an entertainment program of said entertainment device.

32. A three-dimensional model providing apparatus of claim 25, wherein said designated apparatus is a database section and manages the input three-dimensional model and entertainment program.

33. A three-dimensional model providing apparatus of claim 32, wherein said server section reads a model template of entertainment characters from said database section, and the input three-dimensional model is changed at said converting section based on said character model template.

34. A three-dimensional model providing apparatus of claim 32, wherein said server section reads an entertainment program from said database section, and the input three-dimensional model is incorporated into said entertainment program at said converting section.

35. A three-dimensional model providing apparatus of claim 27, wherein a plurality of said entertainment devices exist.

36. A three-dimensional model providing apparatus of claim 27, wherein said plurality of entertainment devices are capable of communicating with each other.

37. A three-dimensional model providing apparatus of claim 23, wherein said designated apparatus is a device connected to a network including a computer.

38. A three-dimensional model providing apparatus for supplying three-dimensional data of a target to a customer, said apparatus comprising:
   an input section for inputting three-dimensional data, wherein said input section comprises:
      a light projection section for projecting light, said light projection section including a surface light source for projecting a light pattern, said light projection section being located behind the target,
      a light reflecting section for reflecting the light pattern incident from said light projection section and projecting the light pattern onto the target, said light reflecting section being located in front of the target,
      a light receiving section for receiving a target image, and
      a modeling section for producing three-dimensional data of said target based on the received target image;
   a server section for managing the three-dimensional data;
   a providing section for providing the three-dimensional data; and
   a communicating section for communicating said three-dimensional data between said input section, server section, and providing section.

39. A three-dimensional model providing apparatus of claim 38, further comprising a target image reflecting section for reflecting the target image formed from the light pattern projected onto the target to the light receiving section.

40. A three-dimensional model providing apparatus of claim 38, further comprising:
   a receiving section for receiving instruction contents from the customer; and
   a converting section for modifying, processing, or converting said three-dimensional data based on said instruction contents.

41. A three-dimensional model providing apparatus of claim 38, further comprising
   an output section for confirming, visually or by audio, the input three-dimensional data or modified or processed three-dimensional data.

42. A three-dimensional model providing apparatus for supplying three-dimensional data of a target to a customer, said apparatus comprising:
   an input section for inputting three-dimensional data, wherein said input section comprises:
      a light projection section for projecting light, said light projection section including a surface light source for instantaneously projecting a two dimensional light pattern,
      a light reflecting section for reflecting the two dimensional light pattern incident from said light projection section and projecting the two dimensional light pattern onto the target,
      a target image reflecting section for reflecting a target image of a complete target formed from the two dimensional light pattern projected onto the target,
      a light receiving section for instantaneously receiving the target image of the complete target reflected at said target image reflecting section, and
      a modeling section for producing three-dimensional data of said target based on the received target image;
   a server section for managing the three-dimensional data;
   a providing section for providing the three-dimensional data; and
   a communicating section for communicating said three-dimensional data between said input section, server section, and providing section.

43. A three-dimensional model providing apparatus of claim 42, further comprising:
   a receiving section for receiving instruction contents from the customer; and
   a converting section for modifying, processing, or converting said three-dimensional data based on said instruction contents.

* * * * *